Oct. 25, 1966    A. GJERDE    3,280,861
ADJUSTABLE MOTOR-DRIVEN UNDERBENCH SAW
Filed May 8, 1964    2 Sheets-Sheet 1

Inventor
ARNE GJERDE
By Toulmin & Toulmin
Attorneys

Oct. 25, 1966  A. GJERDE  3,280,861
ADJUSTABLE MOTOR-DRIVEN UNDERBENCH SAW
Filed May 8, 1964  2 Sheets-Sheet 2
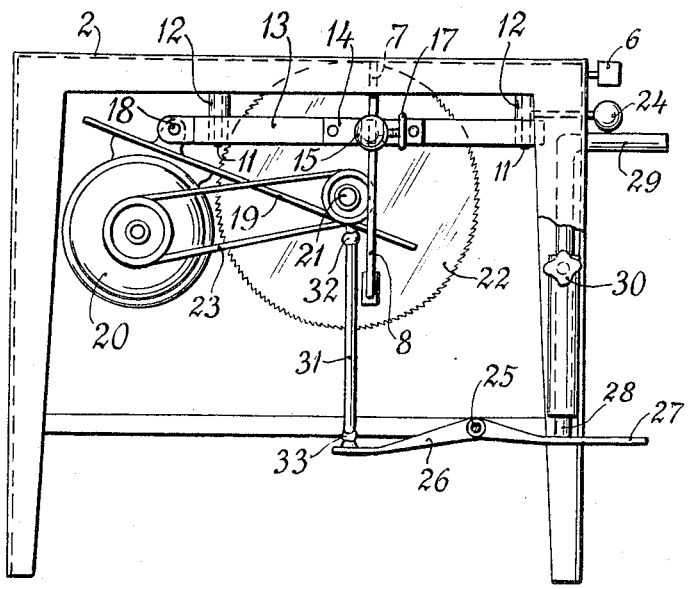
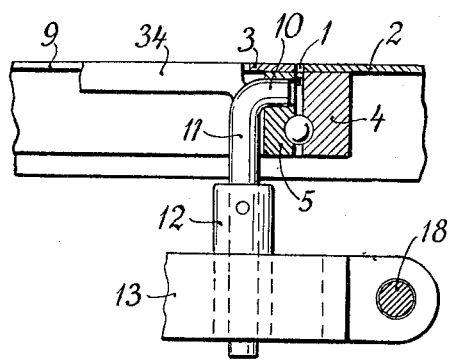
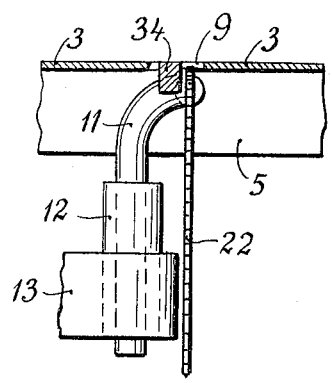
Inventor
ARNE GJERDE
By Toulmin & Toulmin
Attorneys 3,280,861
ADJUSTABLE MOTOR-DRIVEN
UNDERBENCH SAW
Arne Gjerde, Jevnaker, Norway
Filed May 8, 1964, Ser. No. 365,944
Claims priority, application Norway, May 31, 1963,
148,876
4 Claims. (Cl. 143—41)

There are known motor-driven underbench saws which have a circular saw blade and in which motor and bearing for the saw blade spindle are carried by a mounting frame pivotally supported by a cradle which in turn is supported for pivotal motion about an axis extending along a slot formed in a support for the work and through which the saw blade can be moved up and down between a lowered and an operative position by pivotal movement of the mounting frame, whereas the saw blade plane can be adjusted into vertical or inclined positions as desired by tilting and fixing the cradle relative to the support.

Saws of this kind have several advantages. Thus they may be used at will as cross-cut saws or ripping saws for cutting in vertical or inclined planes, and at the same time the saw can be made relatively light and cheap and with small dimensions.

However, with known structures the operation of the saw may to a certain degree be troublesome, and it is a general object of the invention to permit improvements to be achieved in this respect.

Firstly the operation of the saw for cross-cutting during prolonged periods becomes strenuous, especially in inclined positions of the blade, if it is to take place by rocking the mounting frame by hand, because the operator must then stoop repeatedly in inclined directions, and if the support for the work is rotatable in a horizontal plane so as to permit cutting in longitudinal, transverse or oblique directions as desired, he will repeatedly have to change his position when turning the support for adjusting the slot and saw blade into varying positions relative to the work. On the other hand, an operation by pedal, or generally an operation from one and the same place has been difficult to achieve in a tolerably simple way in this case.

It is an object of the invention to overcome this difficulty. With this object in view the invention provides that an articulated rod with universal joints at both ends connects a point located substantially in the rotational axis of the support and on an operating lever pivotally supported in the lower part of the fixed frame-work of the saw, to a point on the mounting frame, so located that the rod, as projected on the vertical plane through the slot, will always extend substantially vertically, and when the cradle is tilted between the extreme positions, passes from one side to the other of the plane through the lower articulation point of the rod and the pivotal axis of the cradle.

The lever may be operated by pedal and/or by a movable handle from a fixed position, and it will be understood that the mechanism will not only be very simple, but also affords a favorable transmission of forces in all positions since the angular deviation of the articulated rod from the tangent to the pivotal axis of the lever in the lower articulation point as well as its angular deviation from the tangent to the pivotal axis of the mounting frame in the upper articulation point will be relatively small even in the extreme positions of the pivotal and tilting movements of the mounting frame and practically independent on the rotational position of the support.

Another fact that has made the operation somewhat troublesome is that in order to be able to operate in tilted positions the blade requires such a wide slot in the support for the work that it is not impossible that when handling the work while the blade is in its normal lower vertical position under the support, the hand may touch the blade unless separate precautions are taken. For this purpose it is known to use detachable covering ledges, which must be removed each time the saw is to operate in a tilted position, and mounted again afterwards.

It is a further object of the invention to ensure perfect safety in this respect without such additional manipulations. With this object in view the invention provides that the cradle includes a horizontal covering ledge which is located in the slot when the blade extends vertically, and which is placed on the side of the saw blade plane opposite to that to which the tilting takes place, so that by tilting it is lowered below the slot and thereby automatically gives room for swinging the blade upwards in its tilted positions.

In the following specification the invention will be further explained, reference being had to the drawings, which illustrate a convenient embodiment of the saw.

FIG. 3 shows the saw seen from the left hand side and with parts of the frame-work broken away for the sake of clearness.

FIG. 4 is a partial section on a larger scale along the line IV—IV in FIG. 1, and FIG. 5 is a partial section on the same scale along the line V—V in FIG. 1.

In order to simplify the illustration structures which are placed on top of the frame-work for screening, for guiding of the work etc., have not been shown, since they are not relevant to the invention.

Figure 1:
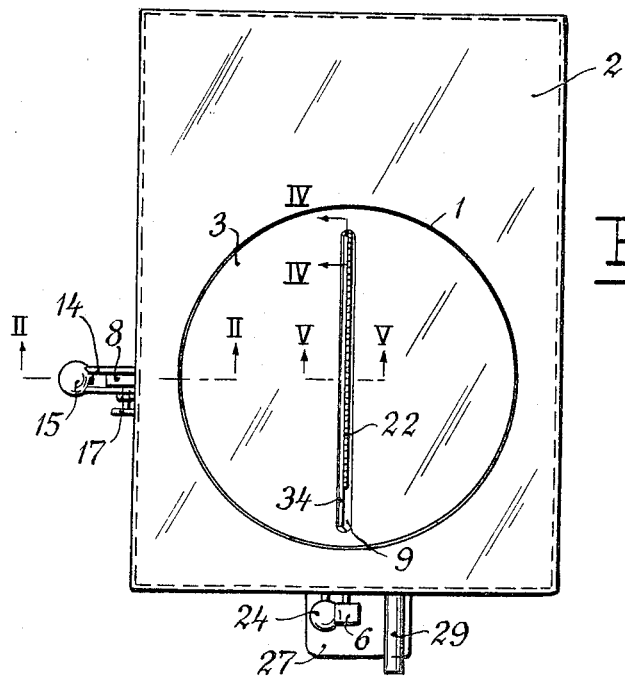
FIG. 1 shows the saw seen from above.
Figure 2:
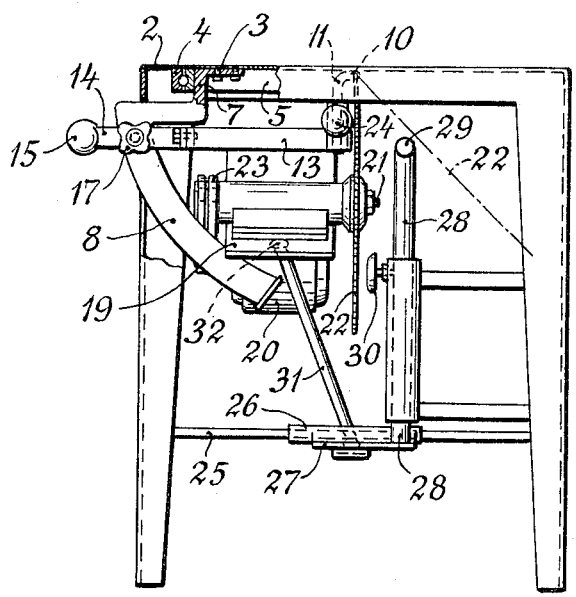
FIG. 2 shows the saw seen from the front end and partially sectioned along the line II—II in FIG. 1.

In the embodiment shown the frame-work of the machine is in the form of an oblong table or bench having four legs and having a circular opening 1 in the table plate 2. In the opening 1 a disc-shaped support 3 for the work is supported for rotation by means of a ball bearing having an outer bearing ring 4 fixed to the bottom side of the table plate and an inner bearing ring 5 fixed to the bottom side of the disc 3. The ring 5 with the disc 3 can be arrested in any rotational position by means of a screw 6 at the front of the saw (not shown in FIG. 2 for the sake of clearness). To the inner faces of the rotatable disc 3 and the ring 5 there is attached a downwardly projecting arm 7 carrying a rail 8 which extends downwards and inwards in a substantially diametrical plane and along a circular arc about a diametrical axis just below the disc 3. In this axis, which extends along a saw blade slot in the rotatable disc, pivots 10 are journalled in the ring 5 at diametrically opposite points. These pivots are provided at the extremity of a couple of hooks 11 attached in bosses 12, which are welded to a stirrup-shaped supporting frame 13 extending to the side on which the rail 8 is located. On the outer side of the stirrup 13 a narrow stirrup 14 is mounted, which extends on either side of the rail 8 and carries a handle 15 at the outer end. Thus, the supporting stirrup 13, the hooks 11 and the stirrup 14 constitute together a cradle which can rock about the pivots 10. A clamping screw 17 inserted in the stirrup 14 permits the cradle to be fixed to the rail 8.

In a pair of lugs on the rear side of the stirrup 13 there is mounted a pivot 18 for a mounting frame 19, which on the bottom side of its rear part carries an electric motor 20 and on its upper side, close to the axis of rotation of the disc 3, carries the bearing for the saw blade spindle 21, to which the blade 22 is fixed in a plane extending through the pivots 10. The motor is connected to the saw blade spindle by a belt drive 23.

At the front the supporting stirrup 13 carries a projecting handle 24 for easy rotation of the rotatable disc.

On a transverse rod 25 in the bottom part of the framework a lever 26 is mounted, which at its front end has a foot plate 27 in order to be capable of serving as a pedal and engages with its upper face the lower end of a rod 28, which is formed with a handle 29 at the top, and which is supported and guided for vertical displacement in the frame-work and can be arrested with a clamping screw 30.

An articulated rod 31 is by means of universal joints 32 and 33 at either end, connected, respectively, to the mounting frame 19 close to the saw spindle bearing and to the inner end of the lever 26 in a point substantially in the axis of rotation of the rotatable disc and constantly supports the mounting frame 19, the latter being approximately balanced, but with a little overweight on the side of the saw spindle. It will be seen that the angle between the articulated rod 31 and the vertical line will not change when the disc is rotated together with the cradle and the mounting frame. In the vertical lower position of the blade 22 as shown the articulated rod 31 extends substantially vertically in the projection on the vertical plane through the slot 9, and when the mounting frame is swung upwards about the pivot 18 it will continue to extend substantially vertically in this projection, since the articulation points 32 and 33 will both move forwards during the pivotal upward motion. As projected on the vertical plane at right angles to the slot, the articulated rod 31 as seen from the front has a slight inclination to the left, and when the cradle is tilted to the position of maximum inclination of the blade (about 45° as indicated in dash-and-dot lines in FIG. 2) the articulated rod will pass through the vertical plane of the slot and finally adopt an inclination of about the same magnitude to the right.

Operation of the saw when used as a cross-cut saw may at will be performed by the foot from the pedal 27, or on loosening the clamping screw 30, by hand by means of the handle 29, and always from the same place irrespective of the rotational position of the rotatable disc and of the tilted position of the cradle.

On the side of the blade 22 which the same is turned away from when tilted, that is the side on which the supporting stirrup 13 is located, a covering ledge 34 is attached to the hooks 11, which ledge in the illustrated position of the cradle, in which the blade 22 stands vertically, extends within the slot 9 so as approximately to fill out the same and thereby forms an efficient protection against touching of the blade 22 in the lowered position thereof. However, in the case of tilting it will be swung down under the rotatable disc according as the cradle is rocked about the pivots 10, since it will constantly adopt the same position relative to the saw blade plane and will thereby clear the slot so as to permit the blade 22 to swing upwards.

It will be understood that the embodiment described and shown is merely illustrative and that many modifications are possible within the scope and spirit of the invention as set out in the appended claims. Thus for instance, the structure may be somewhat simplified by designing the saw merely for operation by foot or by hand only. In the latter case the lever 26 may be designed for carrying a handle at a suitable level and may also be made single-armed and pivoted in the rear part of the table frame.

I claim:

1. An adjustable motor-driven underbench saw having a circular saw blade, a drive motor connected to the saw blade, a saw frame including a stationary framework and a work support thereon above said saw blade, said work support being rotatable on a vertical axis and having a slot therein through which the plane of said blade passes, a cradle in the framework beneath said rotatable work support pivotally supported on said work support for tilting movement about an axis extending in the direction of the length of said slot and closely adjacent said slot, means for fixing said cradle in tilted positions on its axis, a mounting frame carrying said drive motor and saw blade and pivotally supported in said cradle for tilting movement therein about an axis extending substantially at right angles to the length of said slot and displaced laterally from the axis of rotation of said saw blade, an operating lever pivoted in said saw frame and having one end disposed beneath said mounting frame, a rod extending from said operating lever to said mounting frame, universal joints at the ends of said rod connecting the rod to said operating lever and to said mounting frame, the point of connection of said rod to said operating lever being substantially on the axis of rotation of said rotatable work support and the point of connection of said rod to said mounting frame device being so located that the rod, as projected on the vertical plane through the slot, will always remain generally vertical and, when the cradle is tilted between extreme positions, passes from one side to the other of a plane passing through the point of connection of said rod with said operating lever and the pivot axis of the cradle.

2. A saw as claimed in claim 1, in which the lever is two-armed and is operable both by the foot and by a handle which is movable up and down in a fixed path.

3. A saw as claimed in claim 1, in which the cradle includes a horizontal covering ledge thereon which lies in the slot to one side of said blade when the saw blade stands vertically, and which is disposed on the side of the plane of the saw blade opposite to that towards which the saw blade moves when tilting thereof takes place, so that by tilting motion of said saw blade said covering ledge is lowered below the slot.

4. A motor-driven underbench saw having a circular saw blade, a spindle on which the blade is mounted, a drive motor and a support bearing for the saw blade spindle, a frame supporting said bearing and motor, a cradle pivotally supporting said frame, means for movement of the frame in a direction to move said saw blade in its own plane pivotally supporting said cradle for pivotal movement about a predetermined axis, a work support having a slot formed therein extending parallel to and adjacent said axis, said saw blade being movable up and down vertically between a lowered inoperative and an upper operative position by pivotal motion of the mounting frame on said cradle, said saw blade being movable into vertical or inclined positions by swinging of the cradle or its said axis, means for fixing said cradle in its tilted positions, said cradle including a horizontal covering ledge which lies in the slot when the blade stands vertically, and which is placed on the side of the saw blade plane opposite to that towards which the tilting takes place, so that by tilting motion of the cradle and saw blade the covering ledge is lowered below the slot, said cradle being pivotally supported on the underside of said work support, and a frame supporting said work support for rotation about a vertical axis passing through the center of said work support.

No references cited.

WILLIAM W. DYER, JR., *Primary Examiner.*

W. D. BRAY, *Assistant Examiner.*